United States Patent
Kowalski

(10) Patent No.: US 10,549,918 B2
(45) Date of Patent: Feb. 4, 2020

(54) TROUGH-TYPE CONVEYOR, WHICH IS DESIGNED AND CONFIGURED FOR TRANSPORTING FISH TRANSVERSELY TO THE LONGITUDINAL EXTENT THEREOF IN THE TRANSPORT DIRECTION $T_M$, AND ARRANGEMENT AND METHOD FOR TRANSFERRING FISH FROM SUCH A TROUGH-TYPE CONVEYOR TO A TRANSPORT MEANS DOWNSTREAM OF THE TROUGH-TYPE CONVEYOR

(71) Applicant: Nordischer Maschinenbau Rud. Baader GmbH + Co. KG, Lubeck (DE)

(72) Inventor: Wolfhard Kowalski, Putte (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 8 days.

(21) Appl. No.: 15/562,869

(22) PCT Filed: Mar. 7, 2016

(86) PCT No.: PCT/EP2016/054742
§ 371 (c)(1),
(2) Date: Sep. 28, 2017

(87) PCT Pub. No.: WO2016/155977
PCT Pub. Date: Oct. 6, 2016

(65) Prior Publication Data
US 2018/0111761 A1    Apr. 26, 2018

(30) Foreign Application Priority Data
Apr. 2, 2015    (DE) .................. 10 2015 105 164

(51) Int. Cl.
*B65G 17/16*    (2006.01)
*B65G 17/42*    (2006.01)
*B65G 17/36*    (2006.01)

(52) U.S. Cl.
CPC .............. *B65G 17/16* (2013.01); *B65G 17/36* (2013.01); *B65G 17/42* (2013.01);
(Continued)

(58) Field of Classification Search
CPC ....................................................... A22C 25/08
See application file for complete search history.

(56) References Cited

U.S. PATENT DOCUMENTS

| 3,664,482 A | * | 5/1972 | Kornylak | ............. | B65G 17/123 |
| | | | | | 198/802 |
| 5,354,232 A | | 10/1994 | Pontow | | |
| 5,702,295 A | | 12/1997 | Ketels | | |

FOREIGN PATENT DOCUMENTS

| DE | 000878925 C | * | 3/1942 | .......... B65G 17/067 |
| DE | 878925 C | | 6/1953 | |

(Continued)

OTHER PUBLICATIONS

Derwent 2017-71760S (Year: 2017).*
(Continued)

*Primary Examiner* — Jacob S. Scott
*Assistant Examiner* — Lester Ill Rushin
(74) *Attorney, Agent, or Firm* — David B. Tingey; Bryant J. Keller; Kirton McConkie

(57) ABSTRACT

The invention relates to a trough conveyor, which is designed and configured for transporting fish transversely to the longitudinal extent thereof in the transport direction $T_M$, comprising a transport chain which can be rotationally driven and is formed from chain links and has a transport run, which defines the transport plane $E_1$, and a return run, wherein the continuous transport chain is guided about at least two deflection elements, which can be rotated about an axis of rotation $D_U$, for driving and guiding the transport chain, and the transport chain has arranged thereon troughs (Continued)

each intended to receive one fish, which trough conveyor is distinguished in that each trough is arranged on the transport chain so as to be pivotable about an axis of rotation $D_M$ extending transversely to the transport direction $T_M$ and comprises at least one guide body, and in that at least one guide rail for receiving the guide body and for guiding the same is arranged at least in the transition region Ü from the transport run to the return run, wherein the course of the or of each guide rail in the transition region Ü around the deflection element at least partially differs from the course of the transport chain around the deflection element. The invention further relates to an arrangement and a method for transferring the fish from such a trough conveyor to a downstream transport means.

12 Claims, 7 Drawing Sheets

(52) U.S. Cl.
CPC ............... *B65G 2201/0202* (2013.01); *B65G 2812/02287* (2013.01); *B65G 2812/02663* (2013.01)

(56) References Cited

FOREIGN PATENT DOCUMENTS

| DE | 1011810 B | 7/1957 |
|---|---|---|
| DE | 1756838 A1 | 8/1970 |
| DE | 2546748 A1 | 4/1977 |
| DE | 9012906 U1 | 1/1992 |
| DE | 9212788 U1 | 11/1992 |
| DE | 4314525 A1 | 11/1994 |
| FR | 1010737 A | 6/1952 |
| FR | 1584294 A1 | 12/1969 |
| GB | 604141 A | 6/1948 |
| JP | S25-3035 | 9/1950 |
| JP | S48-90350 | 10/1973 |
| JP | S58-30613 | 7/1983 |
| JP | S58216808 A1 | 12/1983 |
| JP | 06239432 A | 8/1994 |
| RU | 2053675 C1 | 2/1993 |
| RU | 2104647 C1 | 2/1998 |

OTHER PUBLICATIONS

International Preliminary Report on Patentability dated Oct. 3, 2017 from International Patent Application No. PCT/EP2016/054742, filed Mar. 7, 2016.
Exam Report dated Jul. 18, 2018 from Danish Patent Application No. 2017PA70737 filed Sep. 29, 2017.
International Search Report and Written Opinion dated Jun. 6, 2016 from International Patent Application No. PCT/EP2016/054742, filed Mar. 7, 2016.
Office Action and Search Report dated Aug. 15, 2018 from Russian Patent Application No. 2017134424.

\* cited by examiner

TROUGH-TYPE CONVEYOR, WHICH IS DESIGNED AND CONFIGURED FOR TRANSPORTING FISH TRANSVERSELY TO THE LONGITUDINAL EXTENT THEREOF IN THE TRANSPORT DIRECTION $T_M$, AND ARRANGEMENT AND METHOD FOR TRANSFERRING FISH FROM SUCH A TROUGH-TYPE CONVEYOR TO A TRANSPORT MEANS DOWNSTREAM OF THE TROUGH-TYPE CONVEYOR

CROSS REFERENCE TO RELATED APPLICATION(S)

This application is a U.S. National Stage Entry of International Patent Application No. PCT/EP2016/054742, filed Mar. 7, 2016, which claims the benefit of German Patent Application No. 10 2015105164.8, filed Apr. 2, 2015, the disclosures of which are hereby incorporated entirely herein by reference.

BACKGROUND

Technical Field

The invention relates to a trough conveyor, which is designed and configured for transporting fish transversely to the longitudinal extent thereof in the transport direction $T_M$, comprising a transport chain which can be rotationally driven and is formed from chain links and has a transport run, which defines the transport plane $E_1$ and a return run, the continuous transport chain being guided about at least two deflection elements, which can be rotated about an axis of rotation $D_U$, for driving and guiding the transport chain, and the transport chain having arranged thereon troughs each intended to receive one fish.

The invention further relates to an arrangement, comprising a first transport means for feeding fish into a transfer region for transferring the fish to a second transport means, the second transport means for discharging the fish taken over by the first transport means, the first transport means being a trough conveyor which is designed and configured to transport the fish transversely to the longitudinal extent thereof in transport direction $T_M$.

Furthermore, the invention relates to a method for transferring fish from a first transport means to a second transport means, comprising the steps: Feeding the fish transversely to the longitudinal extent thereof by means of a trough conveyor in transport direction $T_M$ into a transfer region Ü for transferring the fish to the second transport means, discharging the fish from the troughs in the transfer region Ü by guiding the troughs assigned to a transport chain about a deflection element with the transport chain such that the fish drop onto the second transport means during the transition from a transport run to the return run of said transport chain, and transporting the fish away by means of the second transport means.

Such trough conveyors, arrangements and methods are used in the fish processing industry in order to transport the fish, which lie on their side in the troughs, accurately positioned back-first or abdomen-first to a transfer region and there, namely in the transition region from the transport run to the return run, to discharge them selectively and directionally when the troughs follow the transport chain during deflection around the deflection element. The trough conveyor can be used as a stand-alone apparatus for purely transport purposes or is part of a fish processing machine for transporting along from processing stations in such a manner that the fish lying in the troughs are subjected to processing, for example beheading. Particularly in the case that the trough conveyor is part of a fish processing machine, a further transport means is arranged downstream of the trough conveyor to form an arrangement in such a manner that the fish are to be transferred from the trough conveyor to the downstream transport means.

This purposeful and positionally accurate transfer is particularly important if the fish, after discharge or transfer from the trough conveyor to a downstream transport means are to be transported further thereon and if necessary are to be subjected to further processing steps. An example of such an arrangement provides the trough conveyor in a first processing section of a fish processing machine and the downstream transport means in a second processing section of the fish processing machine. In the trough conveyor, the fish are transported transversely to the longitudinal extent thereof and are transferred, in the transition region from the transport run to the return run, to the downstream transport means by means of which the fish are also transported transverse axially to the longitudinal extent thereof or preferably in the longitudinal extent thereof.

SUMMARY

G 92 12 788 U1 discloses a trough conveyor with the features of the preamble of claim 1 and an arrangement with the features of the preamble of claim 9. This trough conveyor comprises a transport chain with rigid, namely immovable troughs. In other words, the individual troughs are fixedly connected to chain links of the transport chain. As a result, the troughs immediately and directly follow the course of the transport chain or the chain links to which they are attached. In other words, the troughs describe exactly the same path of movement as the chain links of the transport chain. As a result of deflecting the transport chain in the region of a deflection element at the end of the transport run in the transition region to the return run, the fish begin to slide immediately at the beginning of deflection in the transition region and drop down in free fall and uncontrolled. The fish usually drop onto another transport means. However, the fish can also drop into a receptacle or similar. In the usual case where the fish drop onto a second transport means, it is necessary for controlled transfer from the first transport means to the second transport means. In other words, adequate guidance of the fish is required during the free fall. In the above-mentioned G 92 12 788 U1, a cover is provided for this purpose in the transition region from the transport run to the return run as well as in the transfer region to the second transport means, said cover guiding the fish during the deflection at least at the beginning of the discharge and thus, from a time point of view, releases it later in order to shorten the free fall. It has been shown, however, that guidance of the fish in the transfer region is not sufficient and in particular the discharge/transfer of small fish is problematic since the cover is only set to one fish size. The disadvantage is inadequate positioning of the fish on the transport means downstream of the trough conveyor. Furthermore, inaccurate transfer of the fish distorts the exact timing cycle of feeding the fish into the transition region which results in imprecise work results particularly in cycle-based tools along the downstream transport means.

The object of the invention is therefore to create a simple trough conveyor by means of which precise discharge of the transported fish can be achieved in the transition region from the transport run to the return run. The object further consists in proposing a corresponding arrangement and a corresponding method which enable reliable transfer of the fish from the trough conveyor to a second transport means and precise positioning of the fish on the second transport means independent of the fish size.

This object is achieved by an apparatus having the features referred to hereinbefore in that each trough is arranged on the transport chain so as to be pivotable about an axis of rotation $D_M$ extending transversely to the transport direction $T_M$ and comprises at least one guide body, and in that at least one guide rail for receiving the guide body and for guiding the same is arranged at least in the transition region Ü from the transport run to the return run, wherein the course of the or of each guide rail in the transition region Ü around the deflection element at least partially differs from the course of the transport chain around the deflection element. With this embodiment according to the invention, the path of movement of the trough is decoupled from the path of movement of the transport chain at least in sections by means of the guide body on or in the guide rail such that the troughs have a differing course in the region of the deflection, at least as regards their position relative to the transport chain. While the transport chain is already around the deflection element during the deflection phase, due to the forced guidance of the guide body in or on the guide rail, the trough is still in a position in which the fish are prevented from sliding out of the trough. The embodiment according to the invention gives each fish a defined position with respect to the course or its path of movement in the region of the deflection element at which the fish leaves the trough conveyor. Due to the guiding of the troughs independently of the transport chain in the region of the deflection, a controlled tilting of the troughs takes place, as a result of which a delay in the tilting moment during which the fish slide out of the trough is achieved. On the one hand, this significantly reduces the free fall of the fish. On the other hand, the fish are discharged in a more targeted and precise manner.

A particularly preferred embodiment is characterized in that the transport chain is guided in the region of the deflection element arranged in the transition region Ü from the transport run to the return run on a path of movement $B_T$ with a constant radius $r_T$ relating to the axis of rotation $D_U$ while the or each guide rail describes a path of movement $B_F$ for the guide body with a variable radius $r_F$ relating to the axis of rotation $D_U$. This means that the transport chain is guided around the deflection element with a constant radius but the guide body of the trough, and thus also the trough, starting from an orientation initially extending parallel to the transport chain in the region of the deflection element, proceeds with a variable distance to the axis of rotation $D_U$. As a result, the path to be travelled by the trough changes compared to the path of the transport chain, whereby the turning/tilting of the trough with respect to the transport chain can be staggered in terms of time.

The path of movement of the guide body advantageously intersects the path of movement of the transport chain at least twice. As a result, the guide body and thus the trough can be moved out of an initially parallel orientation to the transport chain into another (non-parallel) path of movement and then back into the parallel orientation. Preferably, the distance $A_1$ of the guide rail or of the path of movement $B_F$ of the guide body to the path of movement $B_T$ of the transport chain at the beginning of the deflection or shortly before the beginning of the deflection (just before the 12 o'clock position) is smaller such that the path of movement $B_F$ of the guide body intersects the path of movement $B_T$ of the transport chain shortly after the beginning of the deflection (just after the 12 o'clock position) from the outside inwards. After an approximately 90° rotation about the axis of rotation $D_U$ (just before the 3 o'clock position), the distance of the guide rail or the path of movement $B_F$ of the guide body to the path of movement $B_T$ of the transport chain becomes larger again such that the path of movement $B_T$ of the guide body intersects the path of movement $B_F$ of the transport chain from the inside outwards. The distance $A_2$ corresponds to the distance $A_1$ again in approximately the 4 o'clock position. By means of this configuration, it is possible to generate an optimum and precise tilting moment for the fish which shortens the free fall and ensures exact positioning.

An expedient development of the invention is characterized in that each guide body comprises a cylindrical sliding member whose central axis M is oriented parallel to the axis of rotation $D_M$ of the trough. As a result, precise guidance is accomplished in a particularly simple manner.

A preferred embodiment is characterized in that a guiding groove of each guide rail is approximately U-shaped, each guiding groove oriented radially relative to the axis of rotation $D_U$ being limited downwards and upwards. This means that the guide body, being positively driven, reliably and precisely follows the guiding groove such that the tilting position of the trough is reproducibly controlled.

Expediently, each guide body is arranged in transport direction $T_M$ trailing in relation to the axis of rotation $D_M$ of the associated trough. As a result, this supports the previously described effect of optimizing the path of movement of the trough differently from the path of movement of the transport chain.

An apparatus according to the invention, which is characterized in that the troughs on the preceding side in transport direction $T_M$ are designed to be open in such a manner that the fish lying in the troughs drop out of said troughs in the transition region Ü from the transport run to the return run, is particularly advantageous. This configuration facilitates accurately positioned and optimally timed discharge of the fish.

Advantageously, the troughs have a trough body, which is approximately L-shaped in cross-section, said trough body, at least in the region of the transport run, having a support surface oriented substantially parallel to the transport plane $E_1$ and a contact surface oriented perpendicular to the support surface, wherein the contact surface of the troughs is arranged on the trailing side in transport direction $T_M$ of the support surface. This configuration supports the aforementioned effect.

Such targeted transfer of the fish which is guaranteed by the trough conveyor according to the invention is particularly important when the fish are to be transferred from the trough conveyor according to the invention to a transport means arranged downstream in transport direction $T_M$. For this reason, the object is also achieved by an arrangement having the features referred to hereinbefore in that the trough conveyor is designed and configured according to one or more of claims 1 to 8.

The second transport means is preferably a transport conveyor which is designed and configured for transporting the fish along a longitudinal axis, the transport plane $E_2$ of the transport conveyor being situated below the transport plane $E_1$ of the trough conveyor and the transport direction $T_T$ of the transport conveyor being oriented transversely to the transport direction $T_M$ of the trough conveyor.

The advantages arising from the arrangement according to the invention have already been described in detail in connection with the trough conveyor according to the invention, which is why reference will be made to the relevant passages to avoid repetitions.

The object is also achieved by a method having the steps referred to at the outset in that the troughs of the trough conveyor are guided at least in the transfer region Ü along a course differing from the course of the transport chain.

Preferably, the troughs in the transfer region Ü initially remain in a position substantially corresponding to the position which the troughs have during transport on the transport run, while the transport chain already follows the deflection around the deflection element.

An advantageous development provides that the troughs in the transfer region Ü move on a different path of movement than the transport chain, in that the troughs follow their guide bodies guided in guide rails on a path of movement $B_F$ with a variable radius $r_F$, while the transport chain follows a path of movement $B_T$ with a constant radius $r_T$.

The advantages arising from this have already been described in connection with the trough conveyor according to the invention according to one or more of claims 1 to 8, which is particularly suited to performing the method, and is why reference will be made to the relevant passages to avoid repetitions.

BRIEF DESCRIPTION OF THE DRAWINGS

Further expedient and/or advantageous features and developments emerge from the dependent claims and the description. An especially preferred embodiment of the invention is explained in greater detail with reference to the attached drawing. The drawing shows:

DETAILED DESCRIPTION OF EMBODIMENTS

Figure 1:
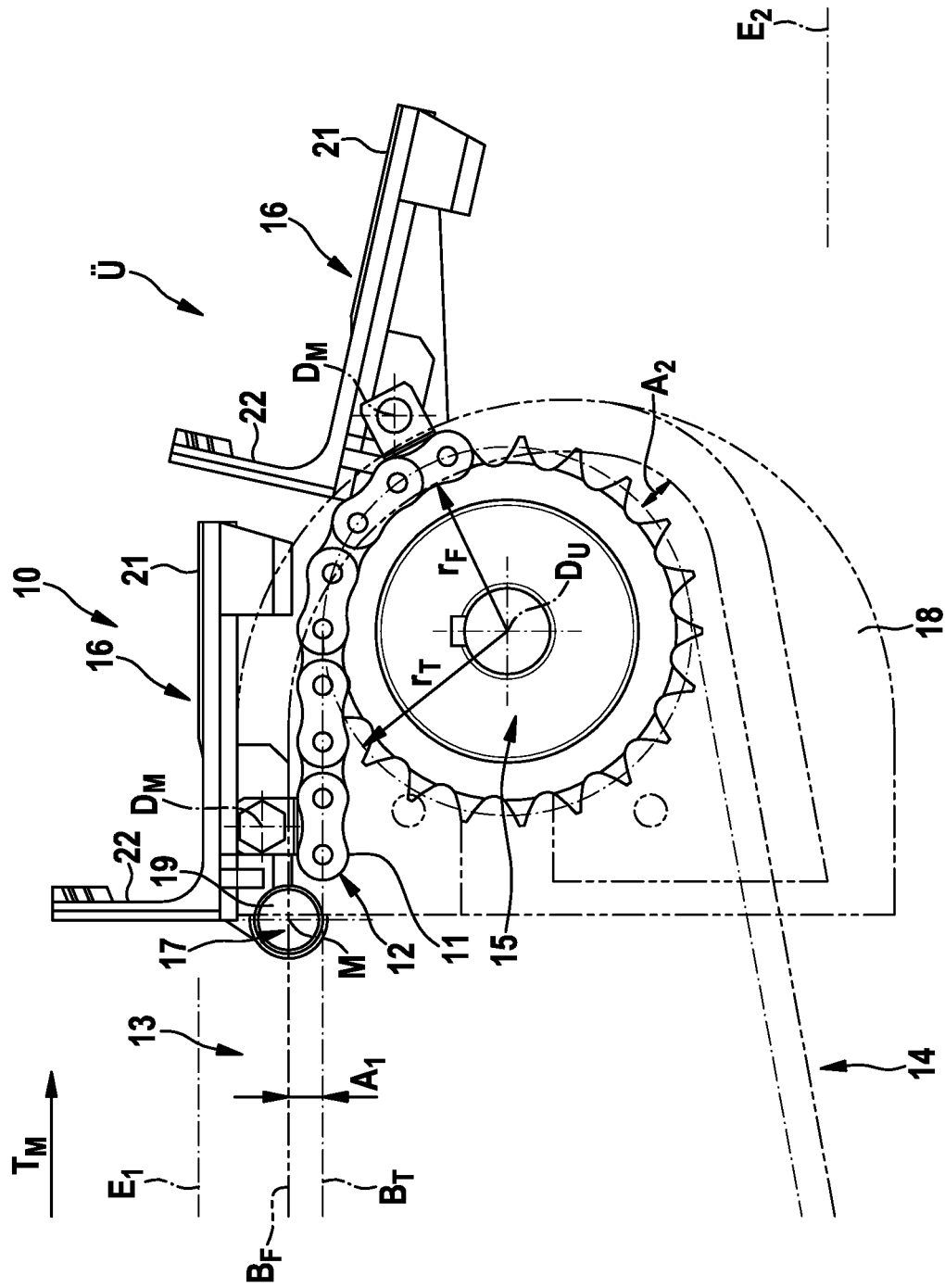
FIG. 1 a schematic representation of the transition region of a trough conveyor from the transport run to the return run in lateral view, FIG. 2 the representation according to FIG. 1 but in a tilting position of the troughs which is further advanced than FIG. 1, FIG. 3 the representation according to FIG. 1 but in a tilting position of the troughs which is further advanced than FIG. 2, FIG. 4 the representation according to FIG. 1 but in a tilting position of the troughs which is further advanced than FIG. 3, FIG. 5 a perspective view of the transition region obliquely from the front and below, FIG. 6 a perspective view of the transition region obliquely from behind and above, wherein the transport chain is not illustrated for the sake of clarity, and FIG. 7 a schematic representation of an arrangement with a trough conveyor and a transport conveyor arranged at right angles to the trough conveyor.
Figure 2:
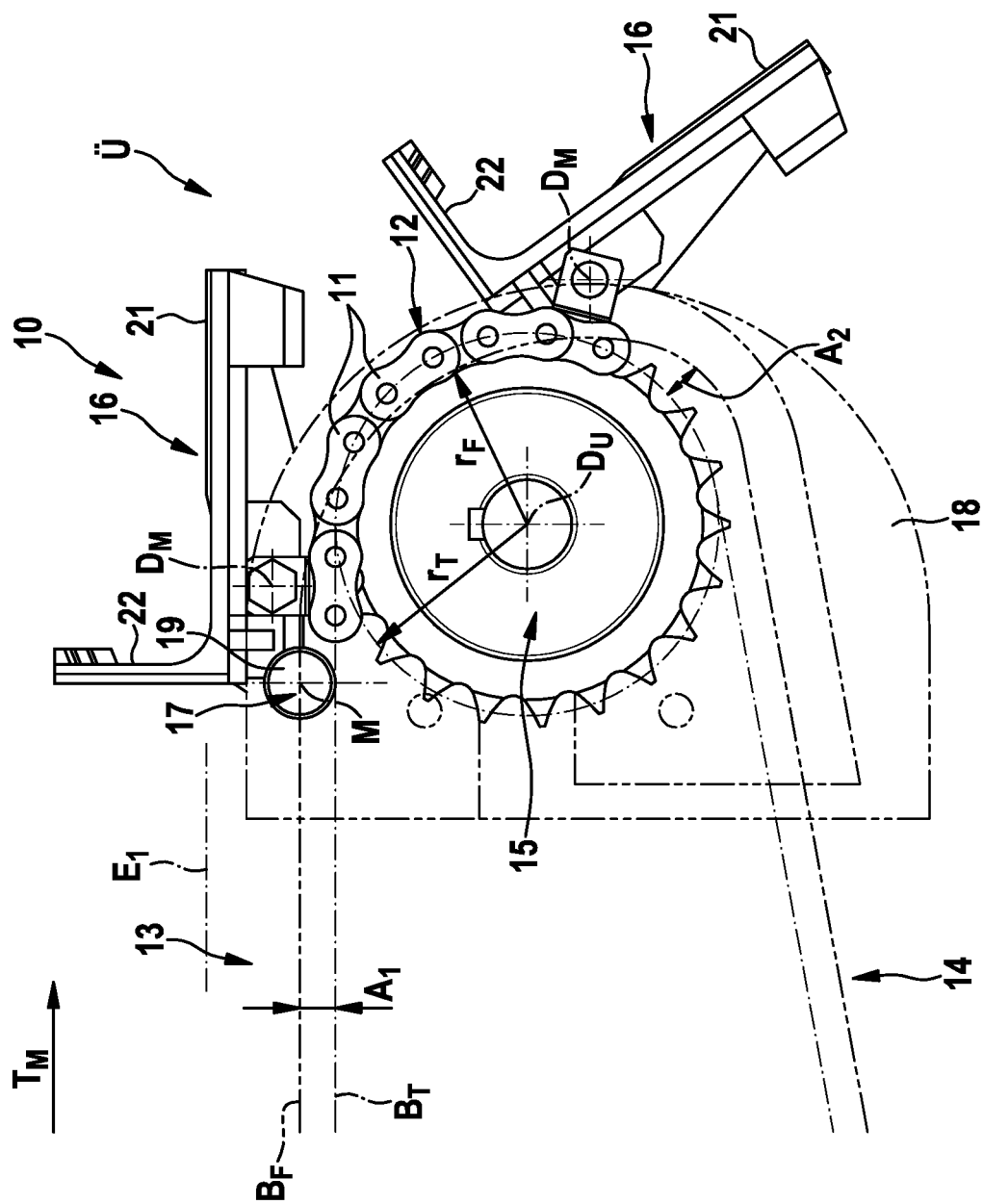
Figure 3:
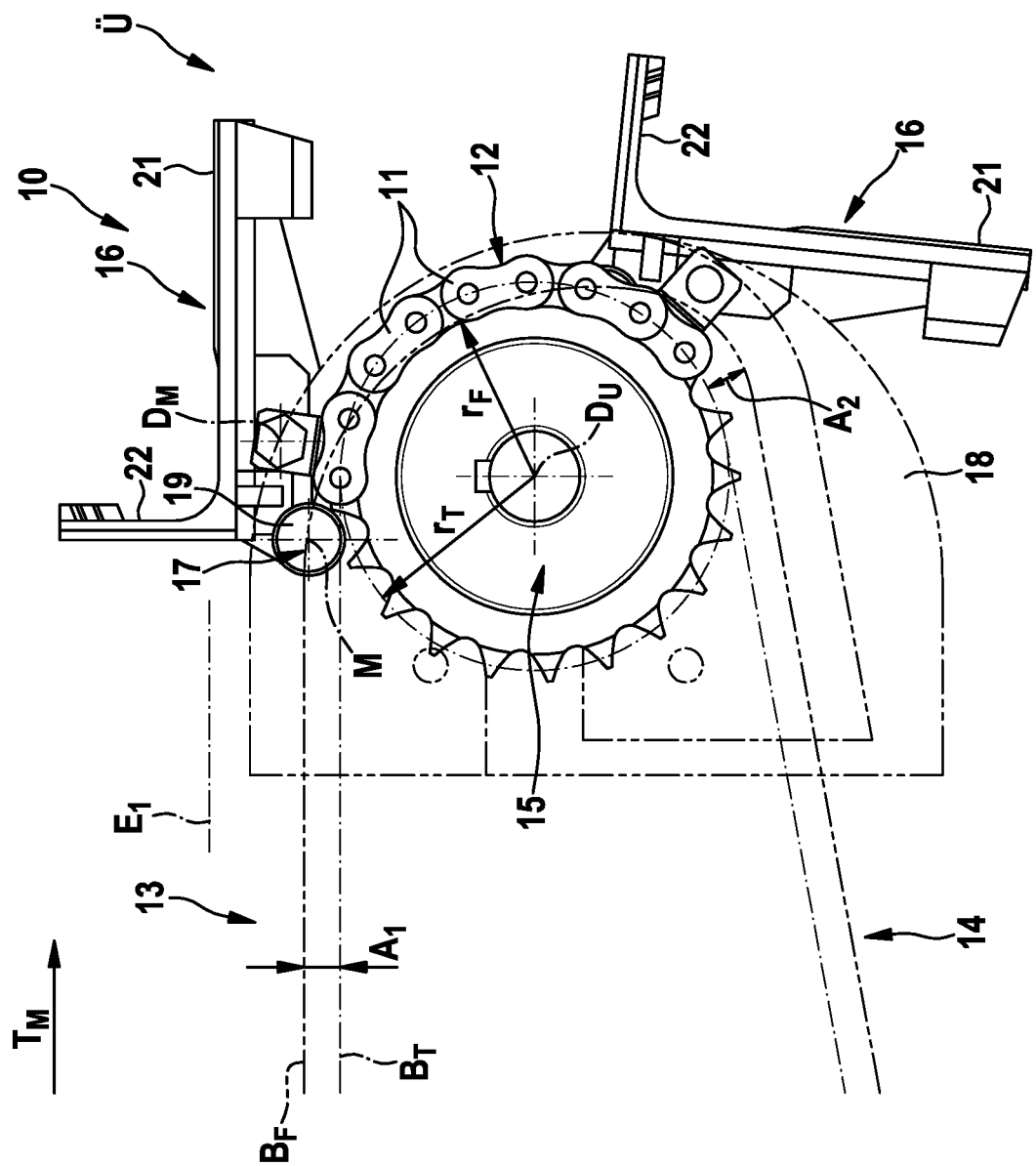
Figure 4:
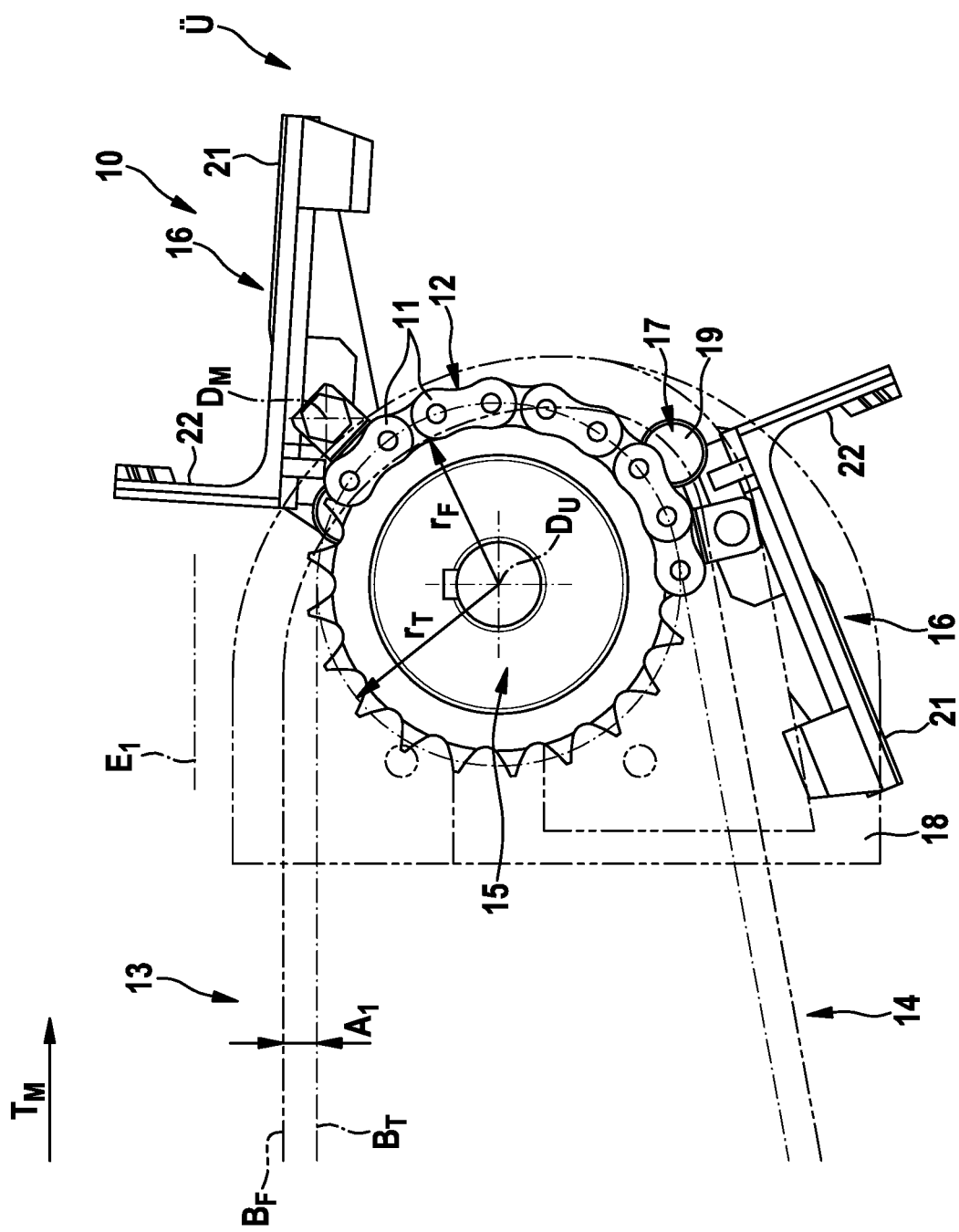
Figure 5:
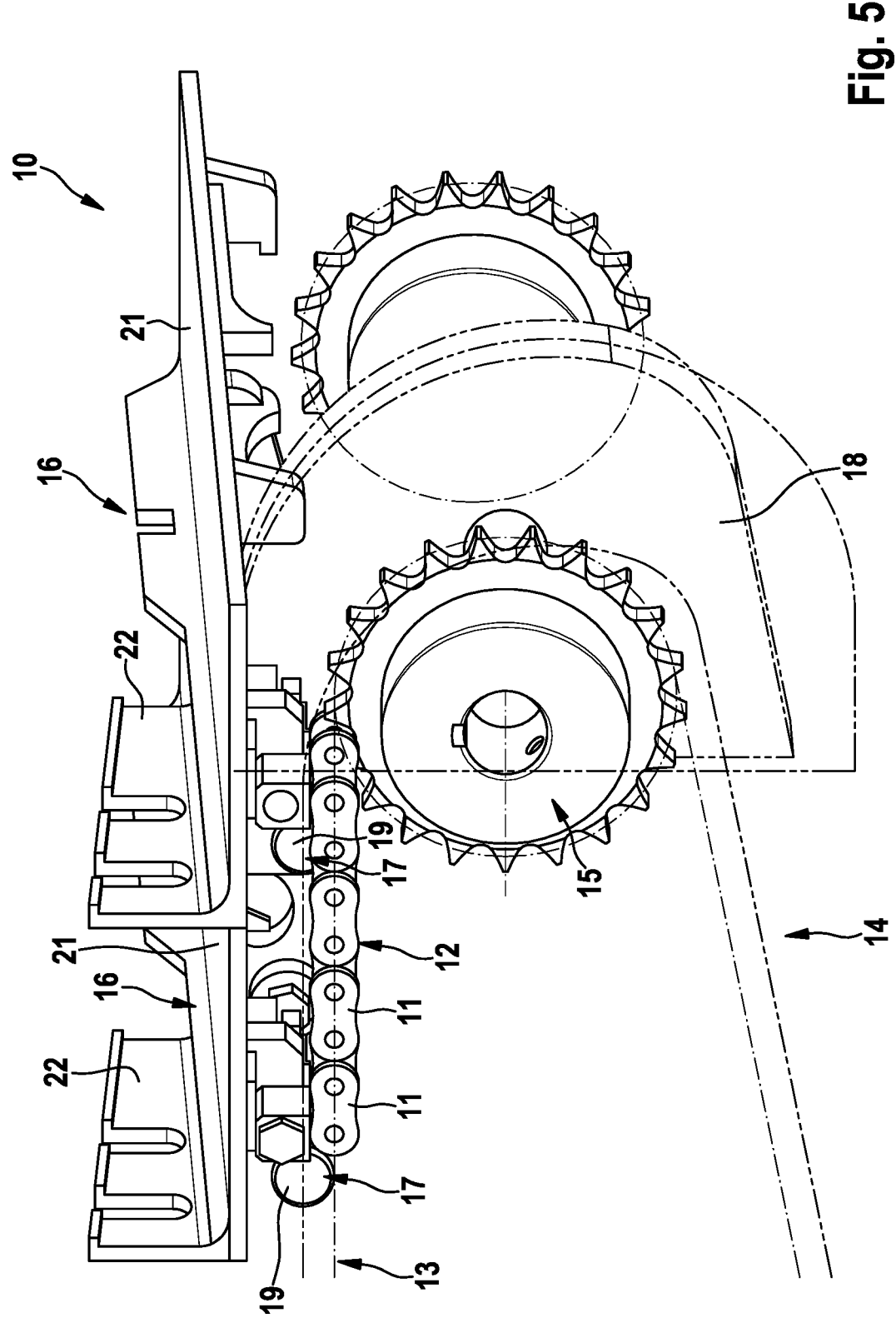
Figure 6:
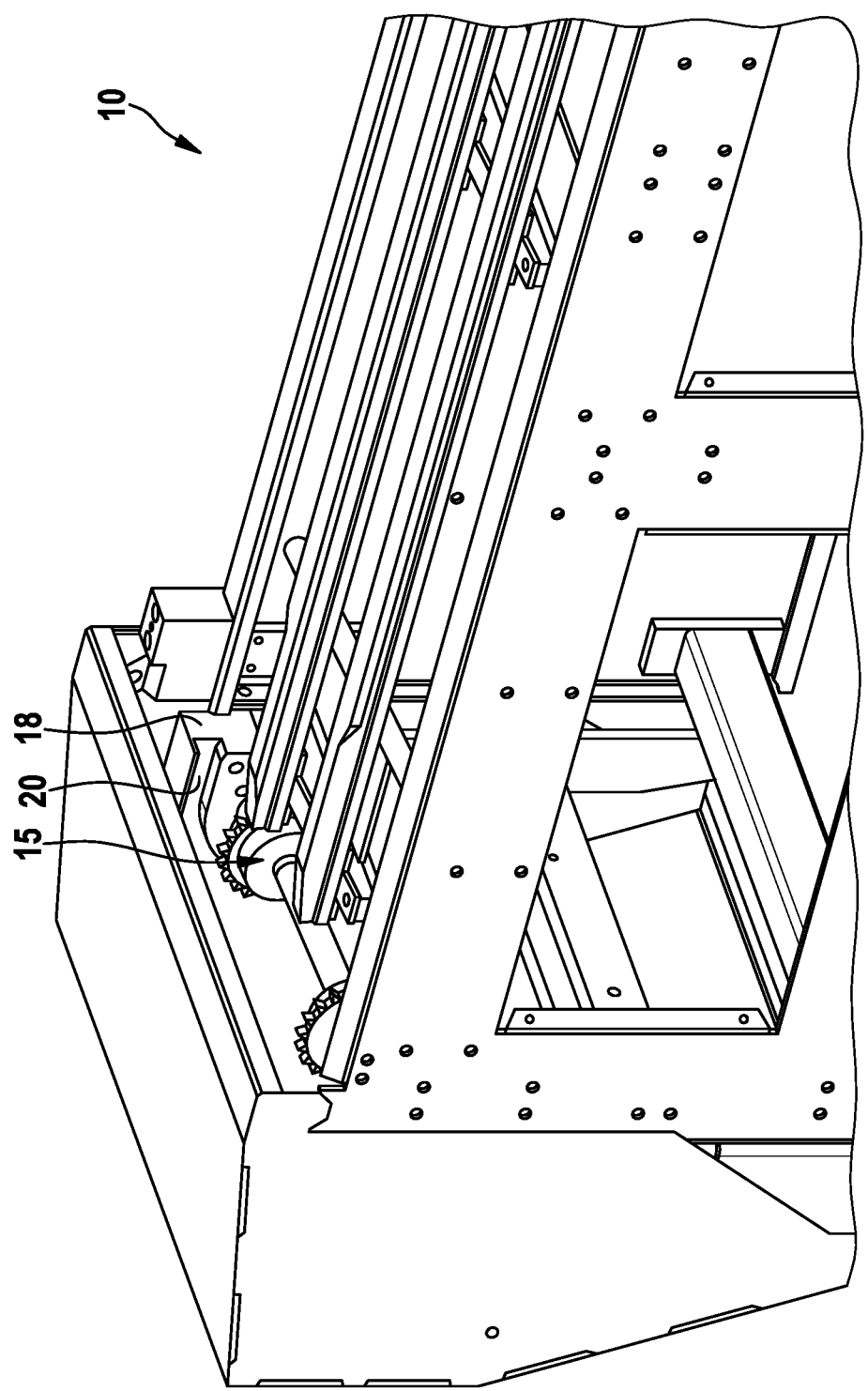
Figure 7:
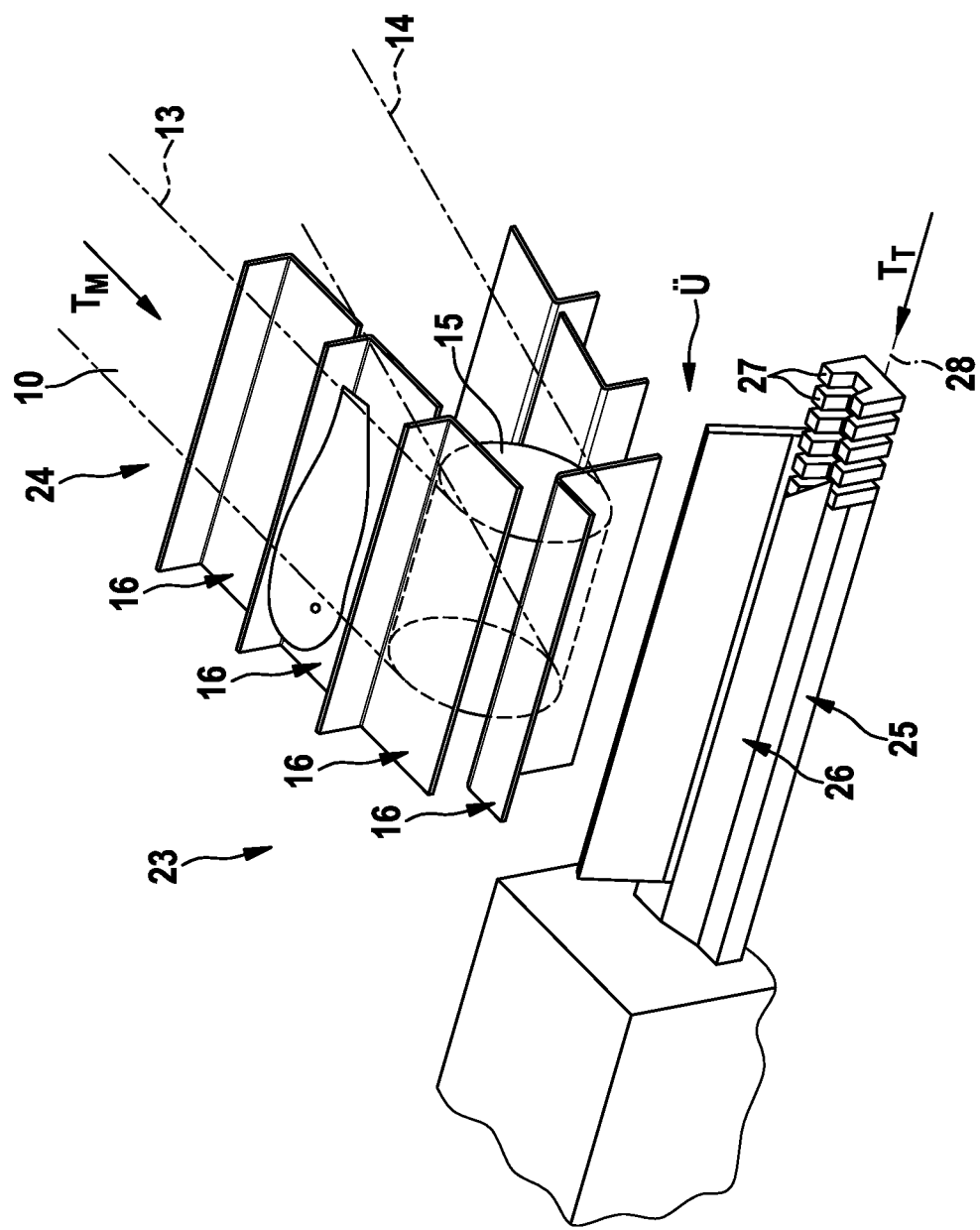

The trough conveyor illustrated in the drawing is used for transporting fish transversely to the longitudinal extent thereof, lying on their side and abdomen-first, to a transfer region in which the fish are transferred to a transport means downstream of the trough conveyor and this then transports them further, abdomen-downwards in the longitudinal extent thereof. The trough conveyor according to the invention and the arrangement formed of trough conveyor and transport means are used, however, in the same manner for transporting fish back-first as well as for further transporting fish transversely to the longitudinal extent thereof on the transport means downstream of the trough conveyor.

FIG. 1 shows the trough conveyor 10 or a detail thereof forming the transition region/transfer region Ü. The trough conveyor 10 is designed and configured for transporting fish transversely to the longitudinal extent thereof in the transport direction $T_M$ and comprises a transport chain 12 which can be rotationally driven and is formed from chain links 11 and has a transport run 13, which defines the transport plane $E_1$ and a return run 14, the continuous transport chain 12 being guided about at least two deflection elements 15, which can be rotated about an axis of rotation $D_U$, for driving and guiding the transport chain 12. Troughs 16 each for receiving one fish are arranged on the transport chain 12. In the transition region Ü from the transport run 13 to the return run 14, that is in the region in which the transport chain 12 is guided around the deflection element 15, the troughs 16 tilt to discharge the fish located on the troughs 16 such that the transfer region Ü for the fish is formed at the end of the transport run 13. After tilting of the troughs and discharge of the fish out of the trough 16, the transport run 13 then becomes the return run 14 again.

This apparatus 10 is characterized according to the invention in that each trough 16 is arranged on the transport chain 12 so as to be pivotable about an axis of rotation $D_M$ extending transversely to the transport direction $T_M$ and comprises at least one guide body 17, and in that at least one guide rail 18 for receiving the guide body 17 and for guiding the same is arranged at least in the transition region Ü from the transport run 13 to the return run 14, wherein the course of the or of each guide rail 18 in the transition region Ü around the deflection element 15 at least partially differs from the course of the transport chain 12 around the deflection element 15. Due to the pivotability of the troughs 16, they are movable relative to the chain links 11 in such a manner that the tilting movement of the troughs 16 in the region of the deflection element 15 can be exerted within the scope of the degrees of freedom independently of the movement of the transport chain 12. By means of the guide bodies 17, which are preferably arranged fixedly on the trough 16, the trough 16 is forced by the guide rail 18 onto a path of movement which differs from the transport chain 12, such that the tilting movement of the troughs 16 can be delayed. The transition region Ü is the region in which the fish drop out of the troughs 16 so that the transition region Ü simultaneously forms the transfer region Ü of the fish to a downstream station, in particular a further transport means (further details below).

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner.

Optionally, each trough 16 can be guided in corresponding guide rails 18 over the entire length of the transport chain 12 of the guide body 17, that is in particular also along the entire transport run 13 and/or the entire return run 14. Preferably, however, guidance of the troughs 16 by means of the guide body 17 within the guide rail 18 is limited to the region of the deflection element 15 at which the transition region Ü is configured. In other words, a portion of a guide rail 18 is assigned on at least one side to the deflection element 15 in the transition region Ü into which portion the guide body 17 is threaded and guided during deflection of the transport chain 12 around the deflection element 15. As mentioned, the guide body 17 is oriented towards one side of the transport chain 12 in order to engage in the guide rail 18 arranged on one side. In other embodiments, the guide body 17 can also be oriented towards both sides of the transport chain 12. In this case, portions of a guide rail 18 are arranged on both sides of the deflection element 15 such that the trough 16 is guided on both sides. The number of the guide bodies 17 on a trough 16, the arrangement and cooperation thereof with suitable guideways, rails or the like can, of course, vary.

The transport chain 12 is guided in the region of the deflection element 15, arranged in the transition region Ü from the transport run 13 to the return run 14, on a path of movement $B_T$ with a constant radius $r_T$ relating to the axis of rotation $D_U$ while the or each guide rail 18 describes a path of movement $B_F$ for the guide body 17 with a variable radius $r_F$ relating to the axis of rotation $D_U$. The path of movement $B_F$ of the guide body 17 preferably intersects the path of movement $B_T$ of the transport chain 12 twice. In the embodiment illustrated, the guide body 17 on its path of movement $B_F$ runs parallel to the path of movement $B_T$ of the transport chain 12 in transport direction $T_M$ until just before the transition region Ü. As a result, the fish lie on the trough 16 in the transport plane $E_1$. At the beginning of the deflection of the transport chain 12, the original distance $A_1$ of the two paths of movement $B_T$ and $B_F$ change in that the distance of the path of movement $B_F$ of the guide body 17 from the axis of rotation $D_U$ becomes smaller and intersects the path of movement $B_T$ of the transport chain 12 from the outside inwards. At the end of the deflection of the transport chain 12, the distance of the two paths of movement $B_T$ and $B_F$ changes again in that the distance of the path of movement $B_F$ of the guide body 17 from the axis of rotation $D_U$ becomes larger and intersects the path of movement $B_T$ of the transport chain 12 from the inside outwards until the path of movement $B_F$ of the guide body 17 again has a distance $A_2$ from the path of movement $B_T$ of the transport chain 12 which corresponds to the original distance $A_1$. Of course, the number of intersections of the paths of movement $B_T$ and $B_F$ can vary, as can the course of the path of movement $B_F$ of the guide body 17 with respect to the path of movement $B_T$ of the transport chain 12.

Each guide body 17 comprises, in the embodiment illustrated, a cylindrical sliding member 19 whose central axis M is oriented parallel to the axis of rotation $D_M$ of the trough 16. A guiding groove 20 of each guide rail 18 is designed and configured approximately U-shaped to receive the sliding member 19, each guiding groove 20 oriented radially relative to the axis of rotation $D_U$ being limited downwards and upwards. In other words, in the region of the deflection element 15, a limiter is provided for the sliding members 19 which prevents radially oriented evasion of the sliding members 19. The configuration and particularly the shape of the guide body 17 can, of course, vary. Accordingly, the guide rails 18 can also be correspondingly adapted or can be replaced by guide systems of different construction. Thus, for example, other sliding or guide bodies can be used which run on or in guides, e.g. with slotted sliding surfaces.

In principle, the position of the or each guide body 17 on the trough 16 is freely selectable. Especially preferably, each guide body 17 is arranged in transport direction $T_M$ trailing in relation to the axis of rotation $D_M$ of the associated trough 16. Each trough 16, on the preceding side in transport direction $T_M$, is designed to be open in such a manner that the fish lying in or on the troughs 16 drop out of said trough or troughs 16 in the transition region Ü from the transport run 13 into the return run 14. Preferably, the troughs 16 have a trough body, which is approximately L-shaped in cross-section, said trough body, at least in the region of the transport run 13, having a support surface 21 oriented substantially parallel to the transport plane $E_1$ and a contact surface 22 oriented perpendicular to the support surface 21, wherein the contact surface 22 of the troughs 16 is arranged on the trailing side in transport direction $T_M$ of the support surface 21. The configuration and design of the troughs 16 can also vary in further embodiments which are not shown. For example, the troughs 16 can also be tub-like in design, the side wall of the trough 16 preceding in transport direction $T_M$ being then preferably pivotally mounted in such a manner that on tipping out of or from the trough 16, the fish press this side wall open. In the embodiment illustrated, the support surface 21 is oriented substantially horizontally in the region of the transport run 13 and defines the transport plane $E_1$. Essentially, in this context, it means that a slight inclination of the support surface 21 in the region of the transport run 13 is also possible.

In further embodiments which are not explicitly illustrated, instead of a chain wheel (according to the drawing), the deflection elements 15 can also be configured as a grooved disc, friction wheel or similar. The number of deflection elements 15 can also vary and be more than two. At least one of the deflection elements 15 can be rotatably driven by a drive which is not shown. The transport chain 12 can be a chain belt extending over the entire width of the trough conveyor 10. Alternatively, two individual chains arranged at a distance from each other can be provided. The transport chain 12 can also be replaced by a conveyor belt or similar to which the troughs 16 are then hingedly attached.

The trough conveyor 10 can be used as a so-called stand-alone solution in a fish processing machine. However, the trough conveyor 10 is preferably a component part of an arrangement 23 which comprises a first transport means 24 for feeding fish into a transfer region Ü for transferring the fish to a second transport means and the second transport means 25 for discharging the fish taken over from the first transport means 24. The first transport means 24 is a trough conveyor 10 which is designed and configured to transport the fish transversely to the longitudinal extent thereof in transport direction $T_M$. The transfer region is located in the end region of the trough conveyor 10. According to the invention, the trough conveyor 10 is designed and configured according to one or more of claims 1 to 8. Accordingly, in respect of the arrangement 23 according to the invention, reference is made to the statements above on the trough conveyor 10.

The second transport means 25 is a transport conveyor 26 which is designed and configured for transporting the fish along a longitudinal axis, wherein the transport plane $E_2$ of the transport conveyor 26 is situated below the transport plane $E_1$ of the trough conveyor 10 and the transport direction $T_T$ of the transport conveyor 26 is oriented transversely to the transport direction $T_M$ of the trough conveyor 10. In an optional embodiment, the transport conveyor 26 is arranged substantially at right angles to the trough conveyor 10 and comprised V-shaped supports 27 which are arranged on a continuously revolving chain conveyor 28. Two continuously revolving spike chains connect to the chain conveyor 28 with the V-shaped supports 27. The transport conveyor 26 can also be a cross conveyor or any other transport element which is designed and configured for transporting away the fish dropping out of the troughs 16 of the trough conveyor 10.

The method according to the invention is explained in greater detail below based on the drawing:

The method is used for transferring fish from a first transport means 24 to a second transport means 25. First the fish are fed in a transport plane $E_1$ transversely to the longitudinal extent thereof by means of a trough conveyor 10 in transport direction $T_M$ into a transfer region Ü for transferring the fish to the second transport means 25. In this case, the fish are received in the troughs 16 sideways such that they are transported with the abdomen or back first. When the fish reach the transfer region Ü, the fish are discharged from the troughs 16 in the transfer region Ü by guiding the troughs 16 assigned to a transport chain 12 about a deflection element 15 with the transport chain 12 such that the fish drop onto the second transport means 25 during the transition from a transport run 13 to the return run 14 of said transport chain 12. During deflection around the deflection element 15, the fish slide from or out of the trough 16 onto the transport means 25 located in a plane $E_2$ below the plane $E_1$. The fish are transported away with the second transport means 25, optionally also transversely to the longitudinal extent thereof or in the longitudinal extent thereof.

According to the invention, the troughs 16 of the trough conveyor 10 are guided at least in the transfer region Ü along a course differing from the course of the transport chain 12. As the troughs 16 are arranged on the transport chain 12, they basically follow said transport chain 12. However, due to the fact that the troughs 16 are pivotable about an axis of rotation $D_M$ extending transversely to the transport direction $T_M$, the orientation of the troughs 16, that is their position relative to the transport chain 12, can be changed particularly in the transfer region Ü. In other words, tilting of the troughs 16 is delayed compared to the course of the transport chain 12 around the deflection element 15. The fish remain longer in or on the trough 16 and only slide out of or from the trough 16 in a defined position.

The troughs 16 remain namely in the transfer region Ü, initially in a position substantially corresponding to the position which the troughs 16 have during transport on the transport run 13, while the transport chain 12 already follows the deflection around the deflection element 15. During transport of the fish along the transport run 13, the troughs 16 or their support surfaces 21 are oriented substantially horizontally. Due to the fact that the troughs 16 in the transfer region Ü move on a different path of movement than the transport chain 12, in that the troughs 16 follow their guide bodies 17 guided in guide rails 18 on a path of movement $B_F$ with a variable radius $r_F$, while the transport chain 12 follows a path of movement $B_T$ with a constant radius $r_T$, this horizontally oriented position of the troughs 16 or their support surfaces 21 is essentially retained. In other words, deflection of the troughs 16 is delayed. The troughs 16 no longer rotate analogously to the deflection element 15 or the deflected transport chain 12 but rather independently of the transport chain 12 in a dedicated guiding groove 20 of a guide rail 18. The method according to the invention, which can be carried out particularly suitably with a trough conveyor 10 according to one or more of claims 1 to 8, results in a targeted discharge of the fish at a lower discharge height.

The invention claimed is:

1. A trough conveyor, which is designed and configured for transporting fish transversely to a longitudinal extent of the trough conveyor in a transport direction $T_M$, comprising a transport chain which can be rotationally driven and is formed from chain links and has a transport run, which defines the transport plane $E_1$, and a return run, wherein the transport chain is guided about at least two deflection elements and the transport plane $E_1$ extends in a substantially horizontal plane between a first and a second of the at least two deflection elements, with at least the first of the at least two deflection elements being rotatable about a first axis of rotation $D_U$ for driving and guiding the transport chain, and the transport chain having arranged thereon a plurality of troughs, with each trough arranged transversely to the longitudinal extent of the trough conveyor and each trough being configured to receive one fish transversely to the longitudinal extent of the trough conveyor, wherein each trough is arranged on the transport chain so as to be pivotable about an axis of rotation $D_M$ extending transversely to the transport direction $T_M$ and comprises at least one guide body, wherein at least one guide rail for receiving the guide body and for guiding the same is arranged at least in a transition region Ü around a portion of the first of the at least two deflection elements, wherein a course of the at least one guide rail in the transition region Ü around the first of the at least two deflection elements at least partially differs from a course of the transport chain around the first of the at least two deflection elements, wherein the transport chain is guided in the transition region Ü around the first of the at least two deflection elements, arranged in the transition region Ü from the transport run to the return run, on a path of movement $B_T$ of the transport chain with a constant radius $r_T$ relating to the axis of rotation $D_U$ while the at least one guide rail directs a path of movement $B_F$ for the guide body with a variable radius $r_F$ relating to the first axis of rotation $D_U$, and wherein the path of movement $B_F$ of the guide body intersects the path of movement $B_T$ of the transport chain at least twice, such that when each trough moves through the transition region Ü at the first of the at least two deflection elements and when each trough comprises the one fish, each trough controllably tilts to slide the one fish out of the trough conveyor.

2. The trough conveyor according to claim 1, wherein each guide body comprises a cylindrical sliding member whose central axis M is oriented parallel to the axis of rotation $D_M$.

3. The trough conveyor according to claim 1, wherein a guiding groove of the at least one guide rail is approximately U-shaped, wherein each guiding groove oriented radially relative to the axis of rotation $D_U$ is limited downwards and upwards.

4. The trough conveyor according to claim 1, wherein each guide body is arranged in the transport direction $T_M$ trailing in relation to the axis of rotation $D_M$ of an associated trough.

5. The trough conveyor according to claim 1, wherein each trough on a preceding side in the transport direction $T_M$ are designed to be open in such a manner that when the one fish is disposed therein, the one fish drops out of each trough in the transition region Ü from the transport run to the return run.

6. The trough conveyor according to claim 1, wherein the each trough comprises a trough body, which is approximately L-shaped in cross-section, said trough body, at least in a portion of the transport run, having a support surface oriented substantially parallel to the transport plane $E_1$ and a contact surface oriented perpendicular to the support surface, and wherein the contact surface of the each trough is arranged on the trailing side, in transport direction $T_M$, of the support surface.

7. An arrangement, comprising a first transport means for feeding fish into a transfer region Ü for transferring the fish to a second transport means, the second transport means for discharging the fish taken over from the first transport means, the first transport means comprising a trough conveyor which is designed and configured to transport the fish transversely to a longitudinal extent the trough conveyor in a transport direction $T_M$, wherein the trough conveyor is designed and configured according to claim 1.

8. The arrangement according to claim 7, wherein the second transport means comprises a transport conveyor which is designed and configured for transporting the fish along a longitudinal axis, wherein a transport plane $E_2$ of the transport conveyor is situated below a transport plane $E_1$ of the trough conveyor and a transport direction $T_T$ of the transport conveyor is oriented transversely to the transport direction $T_M$ of the trough conveyor.

9. A method for transferring fish from a first transport means to a second transport means, comprising the steps:
  feeding the fish transversely to a longitudinal extent of the first transport means by means of a trough conveyor in a transport direction $T_M$ into a transfer region Ü for transferring the fish to the second transport means, the trough conveyor having a plurality of troughs that are each arranged transversely to the longitudinal extent of the first transport means and each configured to receive one fish transversely to the longitudinal extent of the first transport means,
  discharging the fish from the troughs in the transfer region Ü by guiding the troughs on a transport chain about a first deflection element such that the fish drop onto the second transport means during transition from a transport run to a return run of said transport chain, and
  transporting the fish away by means of the second transport means, characterized in that the troughs of the trough conveyor are guided at least in the transfer region Ü along a course differing from a course of the transport chain.

10. The method according to claim 9, wherein the troughs in the transfer region Ü initially remain in a position substantially corresponding to a position which the troughs have during transport on the transport run, while the transport chain already follows a deflection around the first deflection element.

11. The method according to claim 9, wherein the troughs in the transfer region Ü move on a different path of movement than the transport chain, in that the troughs follow their guide bodies guided in guide rails on a path of movement $B_F$ with a variable radius $r_F$, while the transport chain follows a path of movement $B_T$ with a constant radius $r_T$.

12. The method according to claim 9, wherein the fish are fed into the transition region Ü by means of the trough conveyor which is designed and configured for transporting fish transversely to the longitudinal extent of the first transport means in the transport direction $T_M$, comprising the transport chain which can be rotationally driven and is formed from chain links and has the transport run, which defines a transport plane $E_1$, and the return run, wherein the transport chain is guided about at least two deflection elements, which can be rotated about a first axis of rotation $D_u$, for driving and guiding the transport chain, and the transport chain has arranged thereon the troughs each intended to receive one fish, characterized in that each trough is arranged on the transport chain so as to be pivotable about a second axis of rotation $D_M$ extending transversely to the transport direction $T_M$ and comprises at least one guide body, and in that at least one guide rail for receiving the guide body and for guiding the guide body is arranged at least in the transition region Ü from the transport run to the return run, wherein a course of the at least one guide rail in the transition region Ü around the first deflection element at least partially differs from a course of the transport chain around the first deflection element, and wherein the fish are discharged to the transport conveyor.

\* \* \* \* \*